Aug. 4, 1925.
W. H. DICKERSON
ART OF EVAPORATION, CONCENTRATION, OR DESICCATION
Filed May 6, 1920
1,548,665
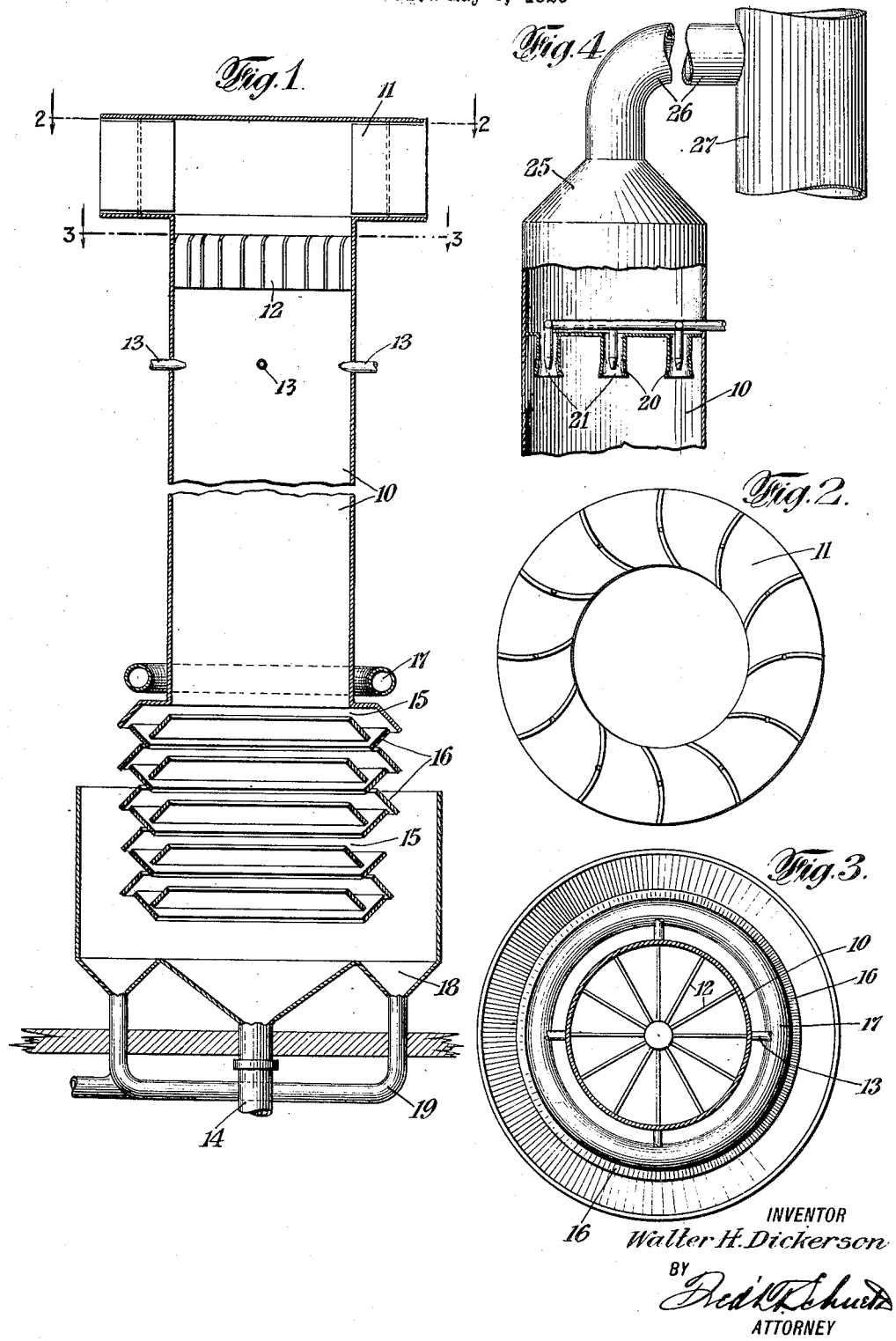
INVENTOR
Walter H. Dickerson
BY
ATTORNEY Patented Aug. 4, 1925.

1,548,665

UNITED STATES PATENT OFFICE.

WALTER H. DICKERSON, OF NEW YORK, N. Y., ASSIGNOR TO INDUSTRIAL WASTE PRODUCTS CORPORATION, OF DOVER, DELAWARE, A CORPORATION OF DELAWARE.

ART OF EVAPORATION, CONCENTRATION, OR DESICCATION.

Application filed May 6, 1920. Serial No. 379,309.

*To all whom it may concern:*

Be it known that I, WALTER H. DICKERSON, a citizen of the United States, and a resident of New York, in the county of New York and State of New York, have invented certain new and useful Improvements in the Art of Evaporation, Concentration, or Desiccation, of which the following is a specification.

The invention relates to a process and apparatus effective for evaporation, concentration of desiccation of various liquids containing solid matter in solution or suspension, more particularly to inducing a thermal circulation of the drying medium employed for this purpose. The novel principle involved lends itself readily to the use of various media, particularly vapors and gases, for example as waste flue gas, and also to the utilization of atmospheric air in certain localities where the same is found to be hot and extremely dry. This is the case, notably, in large sections of tropical and semi-tropical countries, although there are sections in more temperate latitudes where the air, though not so hot, is extremely dry and may be very effective for carrying on the operations aforesaid. In this instance, it is particularly adapted to the concentration or desiccation of natural potash brines, for example, such as are found in the southwestern deserts of the United States, and where the air is very dry.

Various methods have been proposed, and to some extent put into operation, for the concentration of solutions, even to dryness, by the use of direct air evaporation, as for instance by means of a spray pond over whose surface the solution which is to be evaporated is sprayed directly into the atmosphere. The evaporation in this instance depends upon the movement of atmospheric air through the spray over the surfaces of the pond. This method, as well as others, has not proved particularly efficient, however, in that it has not been possible to properly maintain and control the direction of movement of the atmospheric air or the proper commingling of the sprayed solution with the moving air, and because of loss of dry powder by the wind.

In accordance with the present invention, the liquor to be evaporated, concentrated or desiccated is introduced in finely-divided state at the upper portion of a chamber or tower in more or less free communication with the atmospheric air, or with some other source of desiccating gas, thereby cooling said air or gas, increasing its specific gravity and reducing its volume, the air or gas descending and inducing a down-draft in the said tower. This results in a continuous supply of fresh, dry, atmospheric air or gas, which may be regulated to effect the desired degree of concentration of the solution or suspension or the drying of the solid content of the liquid sprayed into the tower.

The nature of the invention, however, will best be understood when described in connection with the accompanying drawings, in which—

Fig. 1 illustrates in vertical section one form of apparatus which may be employed in carrying out the invention.

Figs. 2 and 3 are horizontal sectional views taken respectively along the lines 2—2 and 3—3, Fig. 1.

Fig. 4 is a fragmentary vertical section illustrating a modified arrangement.

Similar characters of reference designate corresponding parts thruout the several views.

Referring to the drawings, 10 designates a chamber or tower suitably constructed and of capacity conforming with the operations in view, and at its upper end may open directly to the atmosphere; or, may be provided at the top with means to rectify the direction of flow and maintain as near as possible thruout the cross-sectional area of the tower a uniform velocity of flow of the downwardly moving column. For example, there may be secured to the upper end of the tower any convenient form of apparatus for preventing the wind or slight atmospheric disturbances from causing eddy currents or irregular currents in the tower. To this end, there is shown mounted thereon a turbine head inlet 11 so that, irrespective of the direction of the wind, the air entering said tower will be given a rapid rotary and then downward movement. The vanes of the head are adjustable, affording control of the air. Moreover, there may be arranged within the tower and just below the turbine head 11 a plurality of radial guide vanes 12 which will so direct the air received from the turbine head as to insure the rotating incoming air moving uniformly in a downward direction.

At the upper end of the tower 10 and below the turbine head 11 and vanes 12 are located means for introducing a solution or suspension in finely-divided or atomized condition. These means may consist, for example, of a plurality of atomizing nozzles 13 of well-known or special design which may be arranged so that the spray will be introduced either in ascending or descending direction or horizontally. Or, the nozzles may be directed tangentially and at a slight downward angle so as to produce a zone of rotating cloud of sprayed solution in the upper part of the tower or chamber 10.

The effect of thus introducing, in finely-divided state, the solution or suspension to be evaporated, concentrated or desiccated will be to cause extremely rapid evaporation with consequent rapid lowering of the temperature and contraction and saturation of the volume of air drawn into the tower and into which the said solution is atomized or sprayed. This cooled, saturated body of air or gas, at a temperature as a rule lower than the surrounding source and of increased weight and diminished volume, will immediately seek a lower level; and as a consequence will induce an intense downward draft thru the tower. This action having once been set up, sufficient supply of dry air or gas will pass in at the top of the tower and thru the spray zone at its upper end to effect not only the desired evaporation, concentration or desiccation, but also to automatically maintain a continuous and very rapid circulation. This will be better understood when it is appreciated that, for example, one cubic foot of dry air at 130° F. weighs .06732 lbs., where as when in a saturated condition at 70° F. it weighs .0742, and its volume will be reduced to 0.90 of a cubic foot. The downward velocity of the circulating air will depend on various factors; notably the difference of temperature between the generally cooler saturated gas within the tower after having passed thru the spray zone and the temperature of the supplied gaseous medium, as well as the proportions of the tower, especially the height thereof. The product, when in dry form, may be suitably collected at the bottom of the tower and removed in any well-known manner as thru an outlet chute 14. In the concentration of natural brines, for example, the product may be in the form of a slurry which can be run off thru said outlet, or the evaporation may be carried to the point of dryness.

At the lower and outlet end of the tower it is preferred, in order to prevent entrainment of fine particles of solution or finely-divided solids in the effluent air or gas, to provide suitable scrubbers as baffles or similar means over which is directed a suitable liquid. For example, there may be provided at the outlet passages 15, a series of annular inclined baffles 16; and over these a continuous stream of water or preferably of the liquid itself, such as brine, may be directed from an annular coil 17 placed thereover. The solution, such as brine, employed to prevent entrainment may be collected at the bottom of the tower in a suitable basin or trough 18 and removed thru a conduit 19.

In Fig. 4, also, the spray nozzles 20 have been shown directed downwardly and located within draft inducing cones 21; and I do not desire to restrict myself to the particular location and arrangement of the specific apparatus employed nor to the particular gas scrubbing means set forth, as the invention is broadly directed to the thermal circulation of the drying gaseous medium as induced by the spraying therein of the liquid containing solid matter in suspension or solution.

Moreover, it may be found advantageous at times to employ hot flue gases and the like; and to this end a hood 25, Fig. 4, may be provided over the top of the tower and suitable connection made, as thru a conduit 26, to a stack 27.

I claim:

1. In the art of desiccation: the method of inducing a circulation of a relatively dry gaseous medium through a chamber in communication therewith, which consists in evaporating therein a liquid medium in finely divided state to cool the gaseous medium to increase its specific gravity and effecting solely by gravity a flow of said gaseous medium through the chamber.

2. In the art of desiccation: the method of inducing a circulation of a relatively dry gaseous medium through a chamber in communication therewith, which consists in spraying a liquid therein, under insufficient mass velocity thereof to effect a flow of the gaseous medium, to cool the gaseous medium to increase its specific gravity and effecting solely by gravity a circulation of said gaseous medium through the chamber.

3. The process of concentrating natural brines by creating a circulation of relatively dry warm air thru an open ended vertically disposed chamber solely by the brine itself, which consists in spraying the said brine into the chamber substantially at its upper end to cool the surrounding air to increase its specific gravity and effecting solely by gravity the circulation of said warm air thru the chamber.

Signed at New York, in the county of New York and State of New York, this 5th day of May, A. D. 1920.

WALTER H. DICKERSON.